United States Patent
Keshavan et al.

(10) Patent No.: US 8,771,389 B2
(45) Date of Patent: Jul. 8, 2014

(54) METHODS OF MAKING AND ATTACHING TSP MATERIAL FOR FORMING CUTTING ELEMENTS, CUTTING ELEMENTS HAVING SUCH TSP MATERIAL AND BITS INCORPORATING SUCH CUTTING ELEMENTS

(75) Inventors: Madapusi K. Keshavan, The Woodlands, TX (US); Monte Russell, Orem, UT (US)

(73) Assignee: Smith International, Inc., Houston, TX (US)

( * ) Notice: Subject to any disclaimer, the term of this patent is extended or adjusted under 35 U.S.C. 154(b) by 746 days.

(21) Appl. No.: 12/775,420

(22) Filed: May 6, 2010

(65) Prior Publication Data

US 2010/0281782 A1 Nov. 11, 2010

Related U.S. Application Data

(60) Provisional application No. 61/176,066, filed on May 6, 2009.

(51) Int. Cl.
*B24B 1/00* (2006.01)
*B24D 11/00* (2006.01)

(52) U.S. Cl.
USPC .......... 51/295; 51/293; 51/297; 51/298; 51/307; 51/308; 428/141; 428/408; 428/548; 428/552; 451/533; 451/539

(58) Field of Classification Search
None
See application file for complete search history.

(56) References Cited

U.S. PATENT DOCUMENTS

| 2,941,241 | A | 6/1960 | Strong |
| 2,941,248 | A | 6/1960 | Hall |
| 2,947,611 | A | 8/1960 | Bundy |
| 3,136,615 | A | 6/1964 | Bovenkerk et al. |
| 3,141,746 | A | 7/1964 | Lai |
| 3,233,988 | A | 2/1966 | Wentorf, Jr. et al. |

(Continued)

FOREIGN PATENT DOCUMENTS

| EP | 0 196 777 B1 | 10/1986 |
| EP | 246789 A2 * | 11/1987 |

(Continued)

OTHER PUBLICATIONS

The International Search Report dated Jan. 14, 2011, for International Application No. PCT/US2010/033936, filed May 6, 2010.

*Primary Examiner* — Kaj K Olsen
*Assistant Examiner* — Ross J Christie
(74) *Attorney, Agent, or Firm* — Christie, Parker & Hale, LLP

(57) ABSTRACT

A method of forming one or more TSP compacts is provided. The method includes placing one or more TSP material layers in an enclosure and surrounding each TSP material layer with at least one of a pre-sintered tungsten carbide powder, pre-cemented tungsten carbide powder, tungsten carbide powder, or partially sintered tungsten carbide substrates. The method also includes exposing the enclosure to a high temperature high pressure process wherein the at least one of a pre-sintered tungsten carbide powder, pre-cemented tungsten carbide powder, tungsten carbide powder, or partially sintered tungsten carbide substrates bond to the TSP material layers forming a stack of TSP material layers including the TSP material layers one over the other with tungsten carbide bonded to each of the TSP material layers and encapsulating each of the TSP material layers.

24 Claims, 7 Drawing Sheets

(56) References Cited

U.S. PATENT DOCUMENTS

| | | |
|---|---|---|
| 3,609,818 A | 10/1971 | Wentorf, Jr. |
| 3,745,623 A | 7/1973 | Wentorf, Jr. et al. |
| 3,767,371 A | 10/1973 | Wentorf, Jr. et al. |
| 4,104,344 A | 8/1978 | Pope et al. |
| 4,108,614 A | 8/1978 | Mitchell |
| 4,151,686 A | 5/1979 | Lee et al. |
| 4,224,380 A | 9/1980 | Bovenkerk et al. |
| 4,255,165 A | 3/1981 | Dennis et al. |
| 4,268,276 A | 5/1981 | Bovenkerk |
| 4,288,248 A | 9/1981 | Bovenkerk et al. |
| 4,289,503 A | 9/1981 | Corrigan |
| 4,303,442 A | 12/1981 | Hara et al. |
| 4,311,490 A | 1/1982 | Bovenkerk et al. |
| 4,373,593 A | 2/1983 | Phaal et al. |
| 4,387,287 A | 6/1983 | Marazzi |
| 4,403,015 A | 9/1983 | Nakai et al. |
| 4,412,980 A | 11/1983 | Tsuji et al. |
| 4,481,016 A | 11/1984 | Campbell et al. |
| 4,486,286 A | 12/1984 | Lewin et al. |
| 4,504,519 A | 3/1985 | Zelez |
| 4,505,746 A | 3/1985 | Nakai et al. |
| 4,522,633 A | 6/1985 | Dyer |
| 4,525,178 A | 6/1985 | Hall |
| 4,525,179 A | 6/1985 | Gigl |
| 4,534,773 A | 8/1985 | Phaal et al. |
| 4,556,403 A | 12/1985 | Almond et al. |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall et al. |
| 4,605,343 A | 8/1986 | Hibbs, Jr. et al. |
| 4,606,738 A | 8/1986 | Hayden |
| 4,621,031 A | 11/1986 | Scruggs |
| 4,629,373 A | 12/1986 | Hall |
| 4,636,253 A | 1/1987 | Nakai et al. |
| 4,645,977 A | 2/1987 | Kurokawa et al. |
| 4,662,348 A | 5/1987 | Hall et al. |
| 4,664,705 A | 5/1987 | Horton et al. |
| 4,670,025 A | 6/1987 | Pipkin |
| 4,673,414 A | 6/1987 | Lavens et al. |
| 4,694,918 A | 9/1987 | Hall |
| 4,707,384 A | 11/1987 | Schachner et al. |
| 4,726,718 A | 2/1988 | Meskin et al. |
| 4,766,040 A | 8/1988 | Hillert et al. |
| 4,776,861 A | 10/1988 | Frushour |
| 4,784,023 A | 11/1988 | Dennis |
| 4,792,001 A | 12/1988 | Zijsling |
| 4,793,828 A | 12/1988 | Burnand |
| 4,797,241 A | 1/1989 | Peterson et al. |
| 4,802,539 A | 2/1989 | Hall et al. |
| 4,807,402 A | 2/1989 | Rai |
| 4,828,582 A | 5/1989 | Frushour |
| 4,844,185 A | 7/1989 | Newton, Jr. et al. |
| 4,850,523 A | 7/1989 | Slutz |
| 4,861,350 A | 8/1989 | Phaal et al. |
| 4,871,377 A | 10/1989 | Frushour |
| 4,882,128 A | 11/1989 | Hukvari et al. |
| 4,899,922 A | 2/1990 | Slutz et al. |
| 4,919,220 A | 4/1990 | Fuller et al. |
| 4,931,068 A | 6/1990 | Dismukes et al. |
| 4,933,529 A | 6/1990 | Saville |
| 4,940,180 A | 7/1990 | Martell |
| 4,943,488 A | 7/1990 | Sung et al. |
| 4,944,772 A | 7/1990 | Cho |
| 4,954,139 A | 9/1990 | Cerutti |
| 4,976,324 A | 12/1990 | Tibbitts |
| 4,984,642 A | 1/1991 | Renard et al. |
| 4,987,800 A | 1/1991 | Gasan et al. |
| 4,991,467 A * | 2/1991 | Packer .................. 76/108.6 |
| 5,011,514 A | 4/1991 | Cho et al. |
| 5,011,515 A | 4/1991 | Frushour |
| 5,027,912 A | 7/1991 | Juergens |
| 5,030,276 A | 7/1991 | Sung et al. |
| 5,032,147 A | 7/1991 | Frushour |
| 5,068,148 A | 11/1991 | Nakahara et al. |
| 5,092,687 A | 3/1992 | Hall |
| 5,096,465 A | 3/1992 | Chen et al. |
| 5,116,568 A | 5/1992 | Sung et al. |
| 5,127,923 A | 7/1992 | Bunting et al. |
| 5,135,061 A | 8/1992 | Newton, Jr. |
| 5,176,720 A | 1/1993 | Martell et al. |
| 5,186,725 A | 2/1993 | Martell et al. |
| 5,193,948 A * | 3/1993 | Noggle .................. 407/116 |
| 5,199,832 A | 4/1993 | Meskin et al. |
| 5,205,684 A | 4/1993 | Meskin et al. |
| 5,213,248 A | 5/1993 | Horton et al. |
| 5,238,074 A | 8/1993 | Tibbitts et al. |
| 5,264,283 A | 11/1993 | Waldenström et al. |
| 5,337,844 A | 8/1994 | Tibbitts |
| 5,355,696 A | 10/1994 | Briggs |
| 5,369,034 A | 11/1994 | Hargett et al. |
| 5,370,195 A | 12/1994 | Keshavan et al. |
| 5,379,853 A | 1/1995 | Lockwood et al. |
| 5,439,492 A | 8/1995 | Anthony et al. |
| 5,464,068 A | 11/1995 | Najafi-Sani |
| 5,468,268 A | 11/1995 | Tank et al. |
| 5,494,477 A | 2/1996 | Flood et al. |
| 5,496,638 A | 3/1996 | Waldenström et al. |
| 5,505,748 A | 4/1996 | Tank et al. |
| 5,510,193 A | 4/1996 | Cerutti et al. |
| 5,523,121 A | 6/1996 | Anthony et al. |
| 5,524,719 A | 6/1996 | Dennis |
| 5,560,716 A | 10/1996 | Tank et al. |
| 5,564,511 A | 10/1996 | Frushour |
| 5,605,198 A | 2/1997 | Tibbitts et al. |
| 5,607,024 A | 3/1997 | Keith et al. |
| 5,620,382 A | 4/1997 | Cho et al. |
| 5,624,068 A | 4/1997 | Waldenström et al. |
| 5,645,617 A | 7/1997 | Frushour |
| 5,667,028 A | 9/1997 | Truax et al. |
| 5,718,948 A | 2/1998 | Ederyd et al. |
| 5,722,497 A | 3/1998 | Gum et al. |
| 5,722,499 A | 3/1998 | Nguyen et al. |
| 5,766,394 A * | 6/1998 | Anderson et al. ............... 51/307 |
| 5,776,615 A | 7/1998 | Wong et al. |
| 5,780,139 A * | 7/1998 | Carter et al. .................. 428/217 |
| 5,820,985 A | 10/1998 | Chow et al. |
| 5,833,021 A | 11/1998 | Mensa-Wilmot et al. |
| 5,853,873 A | 12/1998 | Kukino et al. |
| 5,875,862 A | 3/1999 | Jurewicz et al. |
| 5,887,580 A | 3/1999 | Eyre |
| 5,889,219 A | 3/1999 | Moriguchi et al. |
| 5,897,942 A | 4/1999 | Karner et al. |
| 5,954,147 A | 9/1999 | Overstreet et al. |
| 5,979,578 A | 11/1999 | Packer |
| 6,009,963 A | 1/2000 | Chaves et al. |
| 6,041,875 A | 3/2000 | Rai et al. |
| 6,054,693 A | 4/2000 | Barmatz et al. |
| 6,063,333 A * | 5/2000 | Dennis .............................. 419/6 |
| 6,123,612 A | 9/2000 | Goers |
| 6,126,741 A | 10/2000 | Jones et al. |
| 6,131,678 A | 10/2000 | Griffin |
| 6,132,675 A | 10/2000 | Corrigan et al. |
| 6,165,616 A | 12/2000 | Lemelson et al. |
| 6,193,001 B1 | 2/2001 | Eyre et al. |
| 6,196,341 B1 | 3/2001 | Chaves |
| 6,202,770 B1 | 3/2001 | Jurewicz et al. |
| 6,216,805 B1 | 4/2001 | Lays et al. |
| 6,220,375 B1 | 4/2001 | Butcher et al. |
| 6,234,261 B1 * | 5/2001 | Evans et al. .................... 175/374 |
| 6,248,447 B1 | 6/2001 | Griffin et al. |
| 6,258,139 B1 | 7/2001 | Jensen |
| 6,269,894 B1 | 8/2001 | Griffin |
| 6,298,930 B1 | 10/2001 | Sinor et al. |
| 6,302,225 B1 | 10/2001 | Yoshida et al. |
| 6,315,065 B1 | 11/2001 | Yong et al. |
| 6,344,149 B1 | 2/2002 | Oles |
| 6,410,085 B1 | 6/2002 | Griffin et al. |
| 6,435,058 B1 | 8/2002 | Matthias et al. |
| 6,443,248 B2 | 9/2002 | Yong et al. |
| 6,447,560 B2 | 9/2002 | Jensen et al. |
| 6,544,308 B2 | 4/2003 | Griffin et al. |
| 6,550,556 B2 | 4/2003 | Middlemiss et al. |
| 6,562,462 B2 | 5/2003 | Griffin et al. |

(56) References Cited

U.S. PATENT DOCUMENTS

| | | | |
|---|---|---|---|
| 6,575,350 B2 * | 6/2003 | Evans et al. .............. 228/122.1 |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,662 B2 | 8/2003 | Matthias et al. |
| 6,605,798 B1 | 8/2003 | Cullen |
| 6,739,214 B2 | 5/2004 | Griffin et al. |
| 6,749,033 B2 | 6/2004 | Griffin et al. |
| 6,797,326 B2 | 9/2004 | Griffin et al. |
| 6,861,137 B2 * | 3/2005 | Hughes et al. .............. 51/307 |
| 6,892,836 B1 | 5/2005 | Eyre et al. |
| 7,108,598 B1 | 9/2006 | Galloway |
| 7,316,279 B2 | 1/2008 | Wiseman et al. |
| 7,350,601 B2 | 4/2008 | Belnap et al. |
| 7,377,341 B2 | 5/2008 | Middlemiss et al. |
| 7,517,589 B2 | 4/2009 | Eyre |
| 7,568,770 B2 | 8/2009 | Hall et al. |
| 7,942,219 B2 | 5/2011 | Keshavan et al. |
| 8,002,859 B2 | 8/2011 | Griffo et al. |
| 8,066,087 B2 | 11/2011 | Griffo et al. |
| 2001/0030067 A1 * | 10/2001 | Evans et al. .............. 175/374 |
| 2001/0054332 A1 * | 12/2001 | Cheynet De Beaupre et al. .............. 76/108.1 |
| 2002/0034631 A1 * | 3/2002 | Griffin et al. .............. 428/332 |
| 2002/0045059 A1 | 4/2002 | Griffin et al. |
| 2002/0071729 A1 | 6/2002 | Middlemiss et al. |
| 2002/0084112 A1 | 7/2002 | Hall et al. |
| 2003/0235691 A1 | 12/2003 | Griffin et al. |
| 2004/0094333 A1 | 5/2004 | Yamamoto et al. |
| 2005/0050801 A1 * | 3/2005 | Cho et al. .............. 51/293 |
| 2005/0129950 A1 | 6/2005 | Griffin et al. |
| 2005/0133277 A1 | 6/2005 | Dixon |
| 2005/0210755 A1 | 9/2005 | Cho et al. |
| 2005/0230156 A1 | 10/2005 | Belnap et al. |
| 2005/0263328 A1 | 12/2005 | Middlemiss |
| 2006/0060390 A1 | 3/2006 | Eyre |
| 2006/0060392 A1 | 3/2006 | Eyre |
| 2006/0157285 A1 | 7/2006 | Cannon et al. |
| 2006/0165993 A1 | 7/2006 | Keshavan |
| 2006/0191723 A1 | 8/2006 | Keshavan |
| 2006/0207802 A1 | 9/2006 | Zhang et al. |
| 2006/0247769 A1 | 11/2006 | Molz et al. |
| 2006/0266558 A1 | 11/2006 | Middlemiss et al. |
| 2006/0266559 A1 | 11/2006 | Keshavan et al. |
| 2006/0283639 A1 * | 12/2006 | Yong et al. .............. 175/432 |
| 2007/0029114 A1 | 2/2007 | Middlemiss |
| 2007/0079994 A1 | 4/2007 | Middlemiss |
| 2007/0169419 A1 | 7/2007 | Davis et al. |
| 2007/0181348 A1 | 8/2007 | Lancaster et al. |
| 2008/0029310 A1 * | 2/2008 | Stevens et al. .............. 175/374 |
| 2008/0085407 A1 | 4/2008 | Cooley et al. |
| 2008/0115421 A1 | 5/2008 | Sani |
| 2008/0142276 A1 | 6/2008 | Griffo et al. |
| 2008/0178535 A1 | 7/2008 | Wan |
| 2008/0185189 A1 | 8/2008 | Griffo et al. |
| 2008/0206576 A1 * | 8/2008 | Qian et al. .............. 51/307 |
| 2008/0223621 A1 | 9/2008 | Middlemiss et al. |
| 2008/0223623 A1 | 9/2008 | Keshavan et al. |
| 2008/0230280 A1 | 9/2008 | Keshavan et al. |
| 2008/0240879 A1 | 10/2008 | Dourfaye et al. |
| 2008/0302579 A1 | 12/2008 | Keshavan et al. |
| 2009/0032169 A1 | 2/2009 | Dourfaye et al. |
| 2009/0152018 A1 | 6/2009 | Sani |
| 2012/0222364 A1 | 9/2012 | Lyons et al. |
| 2012/0225277 A1 | 9/2012 | Scott |

FOREIGN PATENT DOCUMENTS

| | | |
|---|---|---|
| EP | 291314 A2 * | 11/1988 |
| EP | 0 300 699 A2 | 1/1989 |
| EP | 0 329 954 A2 | 8/1989 |
| EP | 0 352 811 A1 | 1/1990 |
| EP | 0 500 253 A1 | 8/1992 |
| EP | 0 595 630 A1 | 5/1994 |
| EP | 0 612 868 A1 | 8/1994 |
| EP | 0 617 207 A2 | 9/1994 |
| EP | 0 787 820 A2 | 8/1997 |
| EP | 0 860 515 A1 | 8/1998 |
| EP | 1036913 A1 * | 9/2000 |
| EP | 1 116 858 A1 | 7/2001 |
| EP | 1 190 791 A2 | 3/2002 |
| EP | 0 975 423 B1 | 9/2002 |
| EP | 1 958 688 A1 | 8/2008 |
| GB | 1 349 385 | 4/1974 |
| GB | 2 048 927 A | 12/1980 |
| GB | 2190412 A * | 11/1987 |
| GB | 2204625 A * | 11/1988 |
| GB | 2 261 894 A | 6/1993 |
| GB | 2 268 768 A | 1/1994 |
| GB | 2 270 492 A | 3/1994 |
| GB | 2 270 493 A | 3/1994 |
| GB | 2 323 398 A | 9/1998 |
| GB | 2 351 747 A | 1/2001 |
| GB | 2 367 081 A | 3/2002 |
| GB | 2 408 735 A | 6/2005 |
| GB | 2 413 575 A | 11/2005 |
| GB | 2 418 215 A | 3/2006 |
| GB | 2 422 623 A | 8/2006 |
| GB | 2 427 215 A | 12/2006 |
| GB | 2 429 471 A | 2/2007 |
| GB | 2 429 727 A | 3/2007 |
| GB | 2 438 073 A | 11/2007 |
| GB | 2 447 776 A | 9/2008 |
| JP | 59-219500 | 12/1984 |
| JP | 60-187603 | 9/1985 |
| JP | 2003-291036 A | 10/2003 |
| WO | WO 93/23204 | 11/1993 |
| WO | WO 96/34131 | 10/1996 |
| WO | WO 00/28106 | 5/2000 |
| WO | WO 2004/040095 A1 | 5/2004 |
| WO | WO 2004/106003 A1 | 12/2004 |
| WO | WO 2004/106004 A1 | 12/2004 |
| WO | WO 2007/042920 A1 | 4/2007 |

* cited by examiner

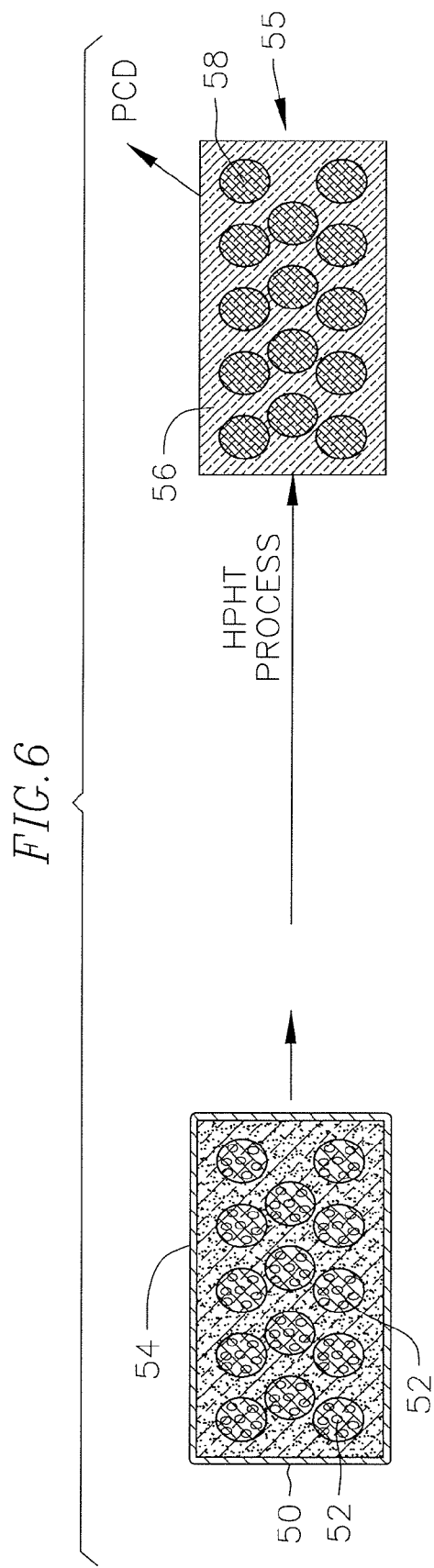
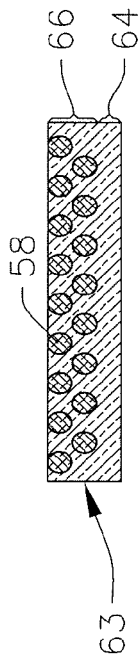
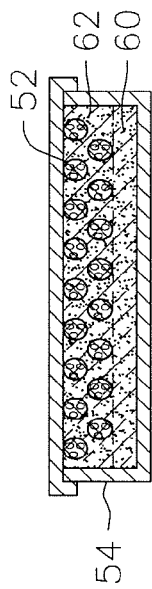

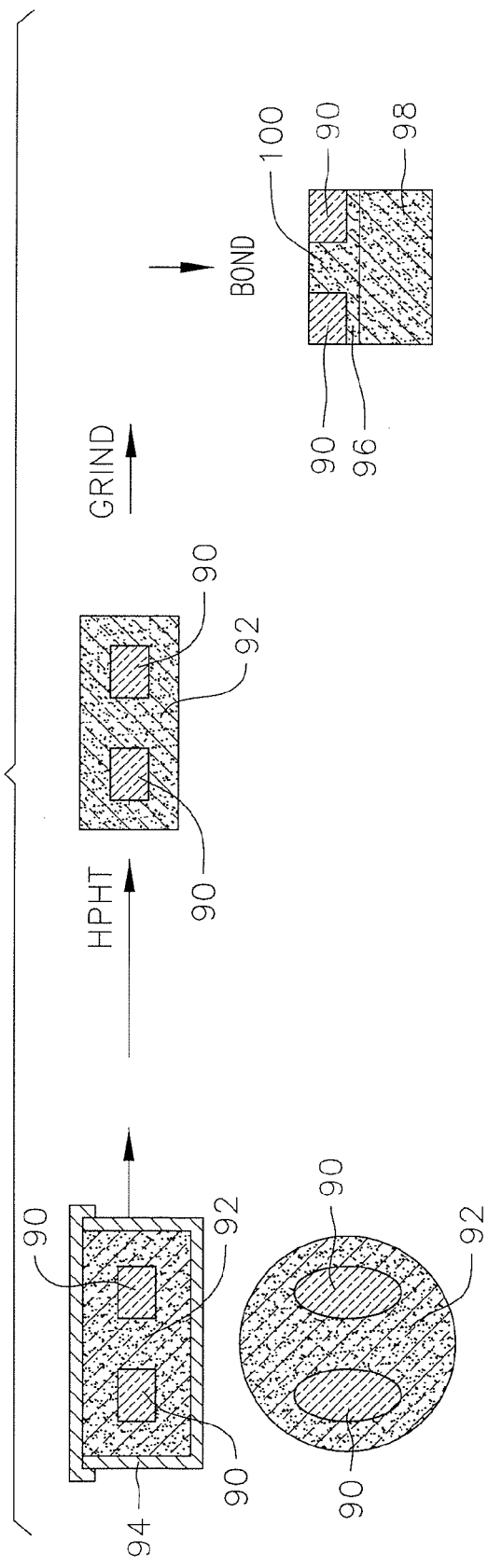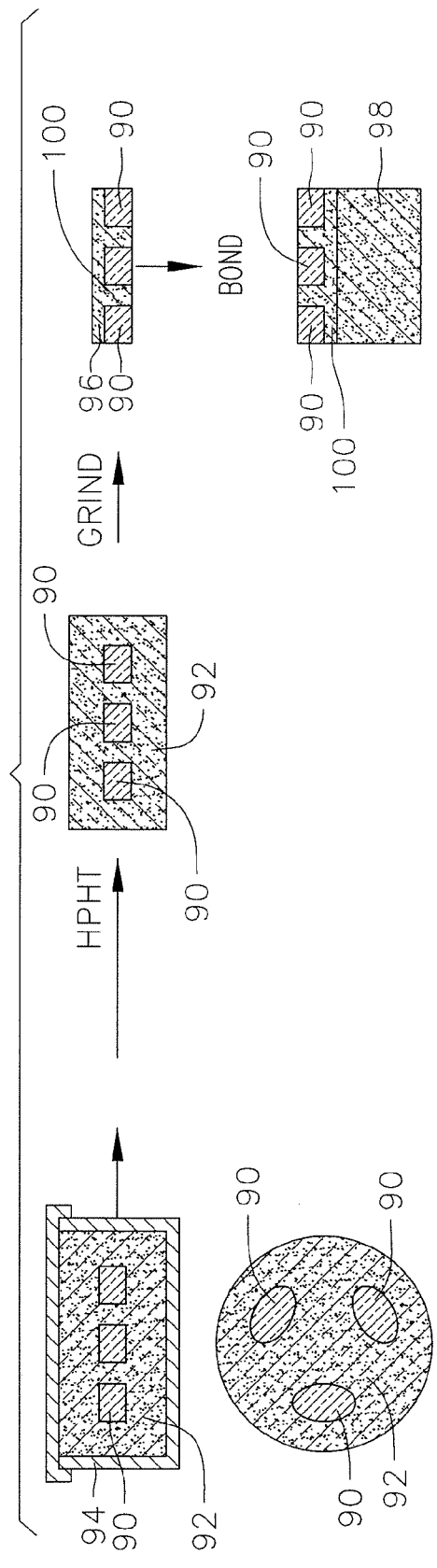

METHODS OF MAKING AND ATTACHING TSP MATERIAL FOR FORMING CUTTING ELEMENTS, CUTTING ELEMENTS HAVING SUCH TSP MATERIAL AND BITS INCORPORATING SUCH CUTTING ELEMENTS

CROSS-REFERENCE TO RELATED APPLICATION

This application is based upon and claims priority on U.S. Provisional Application Ser. No. 61/176,066 filed on May 6, 2009, the contents of which are fully incorporated herein by reference.

BACKGROUND OF THE INVENTION

This invention is directed to a method of forming and attaching thermally stable polycrystalline diamond ("TSP") materials to form new cutting elements and bits incorporating such cutting elements, as well as to such cutting elements and bits.

A TSP material is typically formed by "leaching" at least a substantial portion of a catalyst, such as cobalt, from a polycrystalline diamond ("PCD") material using a leaching agent. When formed, PCD comprises individual diamond crystals that are interconnected defining a diamond network. Catalyst particles, e.g., cobalt particles, are often found within the interstitial spaces in the diamond network. Cobalt has a significantly different coefficient of thermal expansion as compared to diamond, and as such, upon heating of the PCD, as for example upon frictional heating of the PCD which occurs when the PCD is used to cut earth formations, the cobalt expands, causing cracking to form in the network structure, resulting in the deterioration of the PCD layer. PCD having a second phase metal catalyst will generally not have thermal stability at temperatures above 700° C. By removing, i.e., by leaching, the catalyst (e.g., the cobalt) from the diamond network structure, the PCD layer becomes more heat resistant, as well as less prone to cracking when heated.

Typically, to form a PCD layer, a substrate of cemented tungsten carbide (a substrate where tungsten carbide particles are cemented together with a binder such as cobalt) is placed adjacent to a layer of diamond particles, which may also be premixed with a catalyst, such as cobalt, in a refractory metal enclosure typically referred to as a "can", as for example a niobium can, and the combination is subjected to a high temperature at a high pressure where diamond is thermodynamically stable. This process is referred to as a high-temperature-high-pressure sintering process (an "HTHP sintering process"). This process results in the recrystallization and formation of a PCD ultra hard material layer bonded on the tungsten carbide substrate. The PCD layer is then removed from the substrate by cutting off and by lapping off the substrate, as necessary. The removed PCD layer is then leached to substantially remove all of the catalyst to form the TSP material layer. Typically at least 95%, and in many cases over 98% and even over 99% of the catalyst is removed. Removal of the catalyst frees the interstitial spaces in the diamond network, i.e., it creates voids in the diamond network. The TSP material layer may then be attached to another substrate by brazing, or by a high-temperature-high-pressure process (an "HTHP bonding process") where a cemented tungsten carbide (WC-Co) substrate is provided adjacent the TSP material layer and is heated at a sufficient temperature to melt and get infiltration of a binder, such as the cobalt in the tungsten carbide, to infiltrate the TSP material layer and at a sufficient pressure for attaching the TSP material to the substrate forming a TSP material cutting element, such as a TSP material cutter or compact. Moreover, an infiltrant such as a metal or metal alloy infiltrant, as for example copper, silver, copper alloys and silver alloys, which have a melting temperature that is lower than the melting temperature of the diamond particles, may also be used to infiltrate the TSP material when being attached to the substrate. The infiltrant infiltrates into the voids created by the leaching process attaching the TSP material to the substrate. It should be noted that an HTHP bonding process is not a sintering process as is the HTHP sintering process referred in the formation on the PCD. Moreover, the times, temperatures and/or pressures in an HTHP bonding process may be different than those in an HTHP sintering process. In addition, a sintering process requires a catalyst, whereas the bonding process requires an infiltrant. For convenience the term "HTHP process" is used herein to refer to a process requiring high temperature and high pressure as for example an HTHP sintering process or an HTHP bonding process. It should be noted that the acronym "HPHT" may be used interchangeably with the acronym "HTHP". Both acronyms refer to the same thing, i.e. high pressure and high temperature, or high temperature and high pressure.

The current methods of forming TSP material cutting elements by HTHP sintering diamond particles adjacent a tungsten carbide substrate to form PCD bonded to the substrate and then removing the substrate and leaching the PCD to remove the catalyst is a relatively involved process which is relatively costly. Consequently any cutting element formed with such TSP material will also be costly. As such, methods of forming a TSP materials and method for forming cutting elements incorporating such TSP material which are more efficient and thus, less costly are desired.

SUMMARY OF THE INVENTION

In an exemplary embodiment, a method of forming TSP compacts is provided. The method includes placing a plurality of TSP material layers in an enclosure, one TSP material layer over another and surrounding each TSP material layer with at least one of a pre-sintered tungsten carbide powder, pre-cemented tungsten carbide powder, tungsten carbide powder including an infiltrant, or partially sintered tungsten carbide substrates. The method also includes exposing the enclosure to a high temperature high pressure sintering process wherein the at least one of a pre-sintered tungsten carbide powder, pre-cemented tungsten carbide powder, tungsten carbide powder, or partially sintered tungsten carbide substrates bond to the TSP material layers forming a stack of re-processed TSP material layers including the re-processed TSP material layers one over the other with tungsten carbide bonded to each of the re-processed TSP material layers and encapsulating each of the re-processed TSP material layers. The method further includes removing the stack from the enclosure, cutting the stack forming a plurality of re-processed TSP material layers, each of the re-processed TSP material layers having a tungsten carbide material layer formed from the at least one of a pre-sintered tungsten carbide powder, pre-cemented tungsten carbide powder, tungsten carbide powder including an infiltrant, or partially sintered tungsten carbide substrates bonded to one surface thereof, and attaching the tungsten carbide layer bonded to one of the plurality of re-processed TSP material layers to a tungsten carbide substrate forming the TSP compact. In one exemplary embodiment, exposing causes at least a material from at least one of a pre-sintered tungsten carbide powder, pre-cemented tungsten carbide powder, tungsten carbide powder including an infiltrant, or partially sintered tungsten carbide substrates to infiltrate the re-processed TSP material layers. In such embodiment, the method further includes leaching at least a substantial portion of the at least a material from at least a portion of one of the re-processed TSP material layers after the exposing. In one embodiment, the at least a material fully infiltrates said re-processed TSP material layer. In yet another embodiment, the method also includes placing a layer of diamond particles in an enclosure and surrounding the layer of diamond particles with at least one of a pre-sintered tungsten carbide powder, pre-cemented tungsten carbide powder, tungsten carbide powder including a catalyst, or partially sintered tungsten carbide substrates, high pressure and high temperature sintering the enclosure to form a layer of polycrystalline diamond surrounded by tungsten carbide, wherein the layer of polycrystalline diamond has a network of interconnected diamond crystals such that interstitial spaces are defined between the diamond crystals which are occupied by at least a catalyst material which infiltrated said diamond particles from the at least one of a pre-sintered tungsten carbide powder, pre-cemented tungsten carbide powder, tungsten carbide powder including a catalyst, or partially sintered tungsten carbide substrates, removing the tungsten carbide to reveal the layer of polycrystalline diamond, and leaching the layer of polycrystalline diamond to remove at least a substantial portion of the catalyst material from at least a section of the, or from the entire, layer of polycrystalline diamond to form at least one of the TSP material layers. In yet another exemplary embodiment, the method further includes placing a plurality of layers of diamond particles in an enclosure and surrounding the layers of diamond particles with at least one of a pre-sintered tungsten carbide powder, pre-cemented tungsten carbide powder, tungsten carbide powder including a catalyst, or partially sintered tungsten carbide substrates, high pressure and high temperature sintering the enclosure to form a plurality of layers of polycrystalline diamond surrounded by tungsten carbide, wherein the layers of polycrystalline diamond each have a network of interconnected diamond crystals such that interstitial spaces are defined between the diamond crystals which are occupied by at least a catalyst material which infiltrated the diamond particles from the at least one of a pre-sintered tungsten carbide powder, pre-cemented tungsten carbide powder, tungsten carbide powder including a catalyst, or partially sintered tungsten carbide substrates, removing the tungsten carbide to reveal the layers of polycrystalline diamond, and leaching the layers of polycrystalline diamond to remove at least a substantial portion of the catalyst material from at least a section of each, or from each entire layer, of the layers of polycrystalline diamond to form the TSP material layers.

In another exemplary embodiment, a method for forming TSP material is provided including placing a layer of diamond particles and tungsten carbide pellets in an enclosure, wherein the pellets are mixed in the diamond particles, high pressure and high temperature sintering the enclosure forming a layer of polycrystalline diamond with tungsten carbide pellets embedded therein, wherein during the sintering process, a catalyst from the tungsten carbide pellets infiltrates interstitial spaces defined between the diamond particles, and removing at least a substantial portion of the catalyst from at least a portion of the polycrystalline diamond layer with embedded tungsten carbide pellets forming the TSP material layer. In yet another exemplary embodiment, the layer of diamond particles and tungsten carbide pellets is a first layer and the method further includes placing a second layer of tungsten carbide pellets adjacent the first layer in the enclosure, wherein after high pressure and high temperature sintering the layers of tungsten carbide pellets form a layer of tungsten carbide. In a further exemplary embodiment, the method also includes placing a third layer of diamond particles adjacent the first layer in the enclosure, wherein the first layer is sandwiched between the second and third layers in the enclosure, wherein after high temperature and high pressure sintering a compact is formed including the tungsten carbide layer attached to polycrystalline diamond layer having a first portion without tungsten carbide pellets and a second portion with embedded tungsten carbide pellets. In yet a further exemplary embodiment, the tungsten carbide forming the pellets has a grain size which is greater than a maximum grain size of the diamond particles. In another exemplary embodiment, the first layer comprises 80% by volume diamond particles and 20% by volume tungsten carbide pellets. In yet another exemplary embodiment, the first layer comprises 80% to 95% by volume diamond particles and 5% to 20% by volume tungsten carbide pellets. In a further exemplary embodiment, the first layer includes 80% by volume diamond particles and 20% by volume tungsten carbide pellets. In another exemplary embodiment, the first layer includes 80% to 95% by volume diamond particles and 5% to 20% by volume tungsten carbide pellets. In yet another exemplary embodiment, the layer of diamond particles and tungsten carbide pellets is a first layer and the method further includes placing a second layer of diamond particles adjacent the first layer in the enclosure, wherein after high temperature and high pressure sintering a polycrystalline diamond layer is formed having a first portion without tungsten carbide pellets and a second portion with embedded tungsten carbide pellets.

In another exemplary embodiment, a method of forming a TSP material compact is provided including, placing at least one of a pre-sintered tungsten carbide powder, pre-cemented tungsten carbide powder, tungsten carbide powder including an infiltrant, or partially sintered tungsten carbide and at least a TSP material layer in an enclosure, wherein the at least one of a pre-sintered tungsten carbide powder, pre-cemented tungsten carbide powder, tungsten carbide powder including an infiltrant, or partially sintered tungsten carbide substrates encapsulate the at least a TSP material layer, exposing the enclosure to a high temperature high pressure process forming at least a layer of re-processed TSP material bonded to a layer of tungsten carbide, and attaching the layer of tungsten carbide to a substrate forming the TSP material compact. In one exemplary embodiment, the tungsten carbide layer encapsulates the at least a re-processed TSP material layer. In another exemplary embodiment, the at least a TSP material layer is a single TSP material layer, the method further including removing a portion of the tungsten carbide layer exposing a surface of the re-processed TSP material layer and a periphery of the re-processed TSP material layer, wherein attaching includes attaching a remaining portion of the tungsten carbide layer to the substrate, and wherein the remaining portion is sandwiched between the substrate and the re-processed TSP material layer. In a further exemplary embodiment, an infiltrant infiltrates the re-processed TSP material layer during the exposing the enclosure to a high temperature high pressure process, and the method further requires removing at least a substantial portion of the infiltrant from at least a portion of the re-processed TSP material layer. In yet another exemplary embodiment, the at least a TSP material layer comprises a plurality of spaced apart TSP material layers, wherein after exposing the tungsten carbide layer fully encapsulates each of the plurality of re-processed TSP material layers. In yet a further exemplary embodiment, the method further includes removing a portion of the tungsten carbide layer exposing at least surface of each of re-processed TSP material layer of the plurality of re-processed TSP material layers, and wherein attaching includes attaching a remaining portion of the tungsten carbide layer to the substrate. In a further exemplary embodiment, an infiltrant infiltrates the re-processed TSP material layers during the exposing the enclosure to a high temperature high pressure process, and the method further includes removing at least a substantial portion of the infiltrant from at least a portion of each of the re-processed TSP material layers.

BRIEF DESCRIPTION OF THE DRAWINGS

FIG. 6 is a schematic view depicting a method of making another exemplary embodiment TSP material of the present invention.

FIG. 7 is a schematically depicted cross-sectional view of a can with diamond powder and carbide pellets used in making another exemplary embodiment TSP material of the present invention.

FIG. 8 is a schematically depicted cross-sectional view of an exemplary embodiment polycrystalline diamond layer which is used to form an exemplary embodiment TSP material of the present invention.

FIGS. 10, 11 and 12 schematically depict other exemplary embodiment methods for attaching TSP material onto substrates.

DETAILED DESCRIPTION OF THE INVENTION

Figure 1:
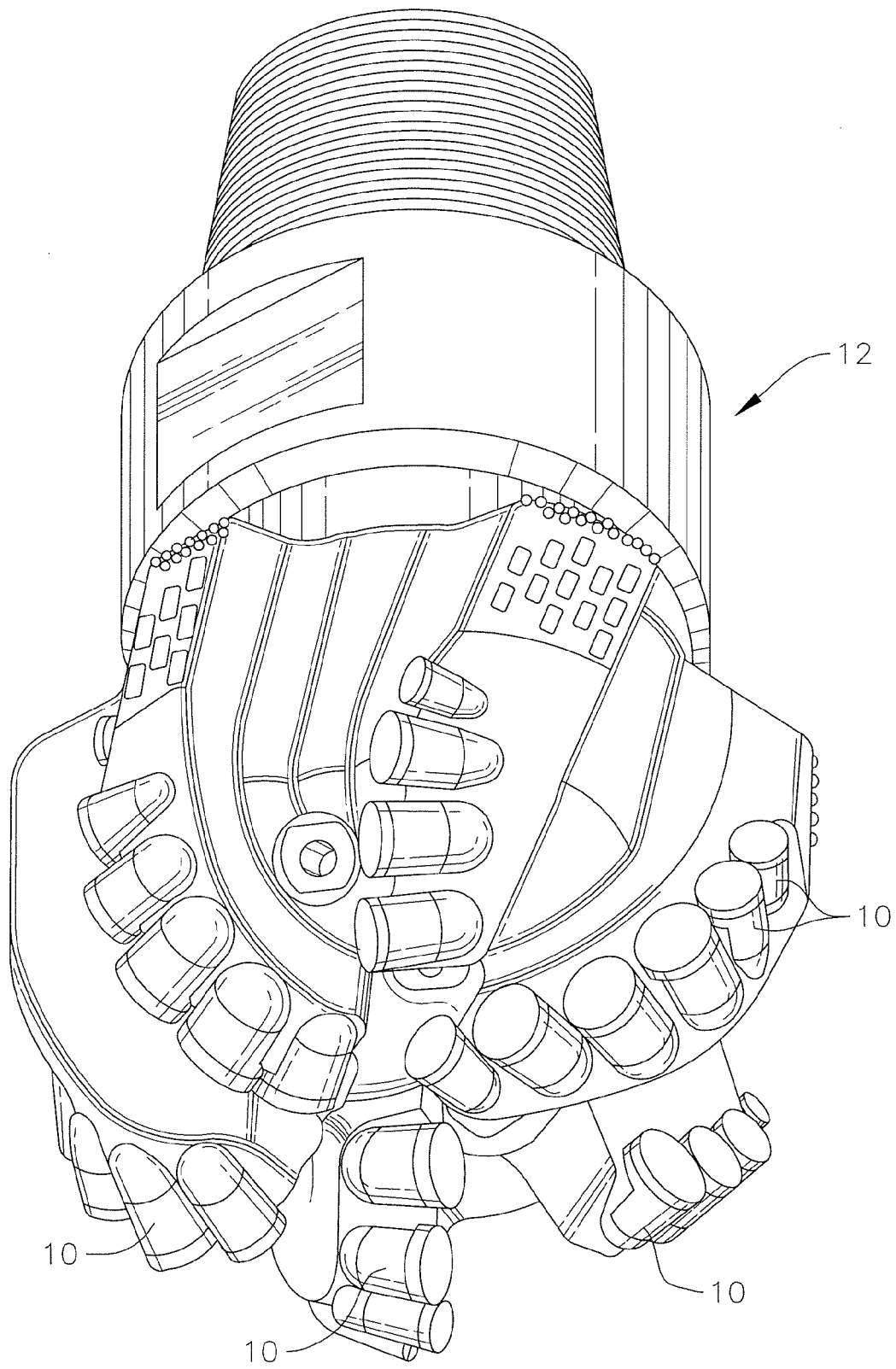
FIG. 1 is a perspective view of a drag bit incorporating exemplary embodiment cutting element of the present invention.

The present invention provides a method for forming TSP material, as well as cutting elements 10 incorporating such material. These cutting elements may be mounted on a bit body, such as a drag bit body 12, as shown in FIG. 1. It should be noted that a "cutting element" as used herein refers to any type of cutting structure including an ultra hard material layer such as a TSP material layer and may or may not include a substrate. For example as TSP material layer by itself is a "cutting element" as is a shear cutter having a TSP material layer attached to a substrate, such as the cutting elements 10 mounted on a bit body 12, as shown in FIG. 1.

Figure 2:
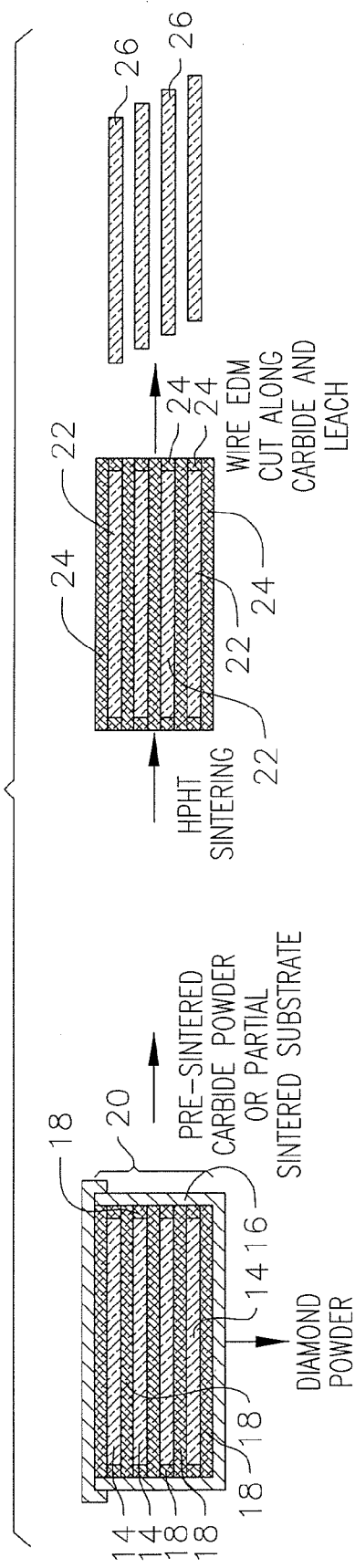
FIG. 2 is a schematic view depicting a process for making an exemplary embodiment TSP material of the present invention.

In an exemplary embodiment, one more layers 14 of diamond particles are placed in a refractory metal enclosure (typically referred to as a "can") can 16 such that each layer is encapsulated by a pre-sintered tungsten carbide powder 18, as for example shown in FIG. 2. The term "encapsulated" as used herein refers to being at least substantially completely encapsulated. The pre-sintered carbide powder, in an exemplary embodiment, is carbide powder that is not fully sintered with a catalyst such as cobalt. Each layer of diamond particles is encapsulated by the pre-sintered carbide powder forming a stack 20 of tungsten carbide powder layers and diamond particle layer(s). The diamond particle size may be the same or different from diamond particle layer to diamond particle layer. The thickness of a pre-sintered carbide powder layer surrounding each diamond particle layer can be tailored in relation to the thickness of the diamond particle layer. In this regard sufficient cobalt from the pre-sintered sintered tungsten carbide powder will be available to the diamond particle layer that the sintered tungsten carbide powder encapsulates. By encapsulating each layer 14 of diamond particles, it is ensured that cobalt is provided to all surfaces of the diamond layer during the HTHP sintering process. In this regard, when HTHP sintering diamond particle layers, especially thicker diamond particle layers, the edges and/or surfaces of the diamond particle layers are not starved of cobalt. In yet another exemplary embodiment, instead of pre-sintered tungsten carbide powder, pre-cemented tungsten carbide powder is used. Pre-cemented tungsten carbide powder in one exemplary embodiment is formed by forming cemented tungsten carbide using known methods and crushing the cemented tungsten carbide to form the pre-cemented tungsten carbide powder. In another exemplary embodiment, instead of pre-sintered tungsten carbide powder, tungsten carbide powder including an infiltrant, as for example cobalt or its alloys may be used. In another exemplary embodiment, instead of a pre-sintered tungsten carbide powder, partially sintered "green" substrates are used to surround each diamond particle layer. These partially sintered substrates may be solid substrates that are not fully densified. In addition, by encapsulating each diamond layer with the tungsten carbide, the tungsten carbide which shrinks more than the diamond during the HTHP sintering process will impose a hoop stress on the diamond. Thus, the diamond will not be in tension thus reducing the chance of crack formation on the diamond.

The can with the diamond particle layer(s) encapsulated by the sintered tungsten carbide powder (pre-cemented tungsten carbide powder, tungsten carbide powder including an infiltrant or pre-partially sintered substrate) are HTHP sintered to form a layer 22 of PCD from each layer of diamond particles 14 surrounded by a tungsten carbide layer 24. If more than one layer of PCD are formed, the layers are separated by cutting along the tungsten carbide layer 24 between adjacent PCD layers. The cutting may be accomplished using known methods, as for example Electro-Discharge Machining (EDM) or laser cutting. The PCD layers may also be lapped or ground using well known methods, such as Electro-Discharge Grinding (EDG). The PCD layer(s) are then leached to remove a substantial portion of their catalyst, e.g., the cobalt and to form TSP material layer(s) 26, as shown in FIG. 2. In an exemplary embodiment, at least 95% of the catalyst is removed from each PCD layer to form a TSP material layer. In another exemplary embodiment, at least 98% of the catalyst is removed, and in a further exemplary embodiment, at least 99% of the catalyst is removed.

Each TSP material layer may then be reattached to a substrate, as for example by placing the TSP material layer adjacent cemented tungsten carbide substrate in a refractory metal can and HTHP processing to bond the TSP material to the substrate. In another exemplary embodiment, each TSP material layer 26 may be encapsulated in a pre-sintered tungsten carbide powder 28 forming a stack 30 of pre-sintered tungsten carbide powder layers 28 and TSP material layer(s) 26, as for example shown in FIG. 3, and placed in a refractory metal can 32. Instead of a pre-sintered tungsten carbide powder, in another exemplary embodiment, each TSP material layer is encapsulated with partially sintered tungsten carbide substrates. The partially sintered substrates may be solid substrates that are not fully densified. In yet another exemplary embodiment, each TSP material layer may be encapsulated in pre-cemented tungsten carbide powder or tungsten carbide powder including an infiltrant such as cobalt and/or its alloys, and metals and metal alloys such as Group VIII and Group IB metals and metal alloys. The can with the TSP material layer (s) and tungsten carbide is then subjected to a HTHP bonding process whereby cobalt from the tungsten carbide infiltrates the TSP material layer(s), thus bonding the TSP material layer(s) to the their adjacent tungsten carbide layers to form a bonded stack 34 of TSP material layer(s) bonded to tungsten carbide layers 36 as for example shown in FIG. 3. Other infiltrants such as metals or metal alloys, as for example copper, silver, copper alloys and silver alloys, which have a melting temperature that is lower than the melting temperature of the diamond particles, and which may have a coefficient of thermal expansion similar to that of the diamond may also be used, as for example, less than three times the coefficient of thermal expansion of diamond. It should be understood that any portion of a TSP material that is infiltrated with a metal or metal alloy infiltrant, e.g., cobalt, may no longer be a TSP material as it would include the metal or metal alloy infiltrant, e.g the cobalt. However, for descriptive purposes such portion is described herein as being a TSP material that is infiltrated or a re-processed TSP material layer.

Figure 3:
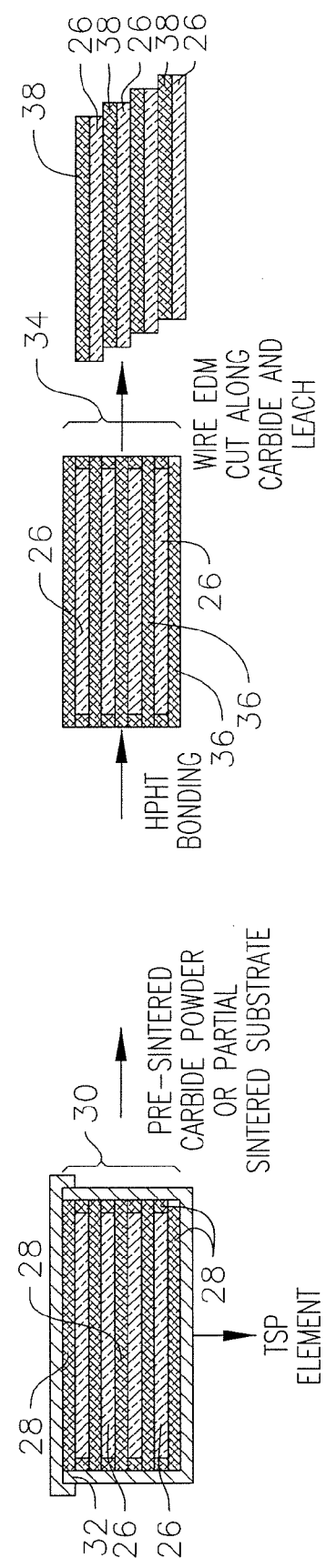
FIG. 3 is a schematic view depicting a method of attaching TSP material of the present invention onto a substrate.
Figure 4:
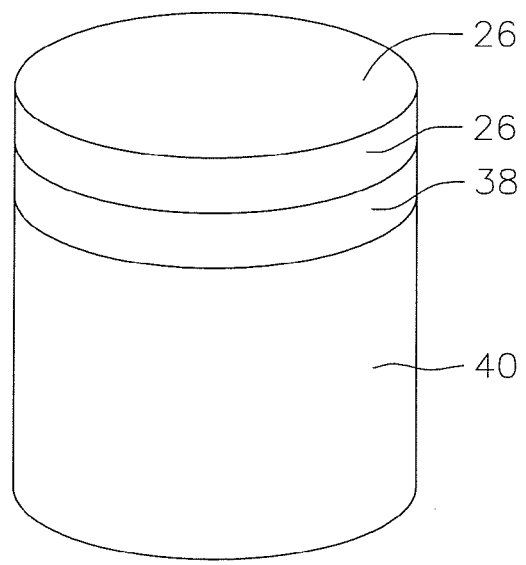
FIGS. 4, 5A, and 5B are perspective view of exemplary embodiment cutting elements of the present invention.

The bonded stack 34 of TSP material layers (or single TSP material layer) bonded to and surrounded by a tungsten carbide substrate material layers 36 is recovered from the can. The necessary tungsten carbide material (i.e., the necessary the tungsten carbide layers) is then removed by cutting and/or lapping off using known methods to expose a TSP material layer bonded on a tungsten carbide layer 38 (i.e., a substrate layer 38). If a stack 34 of TSP material layers are formed, the TSP material layers are cut using known methods such that a plurality of TSP material layers are formed, as shown in FIG. 3, each attached to a corresponding substrate layer 38. Each TSP material layer attached to a substrate layer may then be attached, as for example by brazing to another tungsten carbide substrate 40 by attaching the substrate layer 38 attached to the TSP material layer to the other tungsten carbide substrate 40, as for example shown in FIG. 4.

Figure 5A:
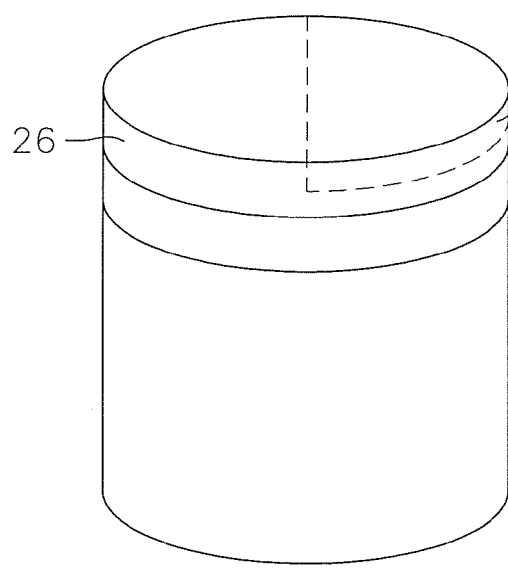
Figure 5B:
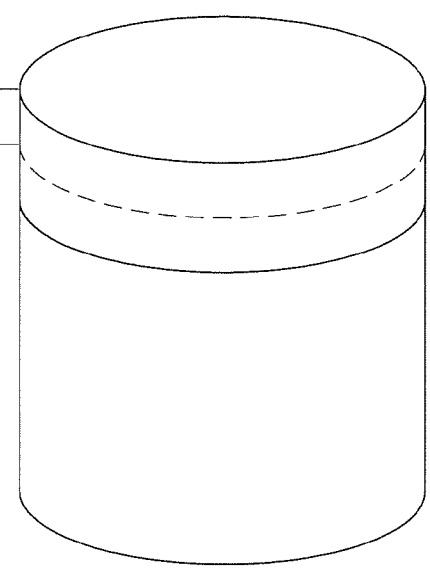

Infiltrant that infiltrated the TSP material layer during the HTHP bonding process, e.g., the cobalt from the tungsten carbide, or other added infiltrants, may be removed from at least a portion of the TSP material layer by re-leaching. A select portion 42 of the TSP material layer may be re-leached, as for example shown in FIG. 5A. For example, the TSP material layer may be re-leached to a desired depth 44 as for example shown in FIG. 5B. For cutting that generates increased frictional heat, a deeper infiltrated TSP material layer portion may have to be re-leached. The depth of the leached region may be dependent on the type of earth formations that will be cut by the TSP material layer. For example, with earth formations that will generate higher frictional heat on the TSP material layer, the leached portion that will make contact with the earth formations should be deeper. Thus, the size of the leached portion of the TSP material layer may be defined by the type of cutting for which the TSP material layer will be used. In this regard, by limiting the depth and/or size of the leached region, the time required to leach the infiltrant is also limited, i.e., reduced.

In another exemplary embodiment, diamond particles 50 are mixed tungsten carbide pellets including a catalyst material, as for example cobalt. Thus, in one exemplary embodiment, tungsten carbide (WC—Co) pellets 52 and placed in a refractory metal can 54. In another exemplary embodiment, the tungsten carbide pellets are cemented tungsten carbide pellets 52. In yet another exemplary embodiment, the pellets are sintered tungsten carbide pellets. These pellets are referred to herein as "tungsten carbide pellets" and they include a catalyst material. The can with the diamond powder and pellets is then HTHP sintered whereby the cobalt from the tungsten carbide pellets infiltrates the interstitial spaces between the diamond crystals and acts as a catalyst for forming a layer 55 of PCD 56 with tungsten carbide pellets 58 embedded therein (FIG. 6). Consequently, the PCD formed will have a higher density due to the higher density of the tungsten carbide pellets within the PCD. The PCD layer 55 with the embedded tungsten carbide pellets is removed from the can and then leached to remove at least a substantial portion of the catalyst. For example at least 95% of the catalyst, or at least 98% and even at least 99% of the catalyst is removed. The leaching will be enhanced, (i.e., will be faster) due to the presence of the carbide pellets and the lower density of the PCD. The leaching will form a TSP material layer having a lower density and thus improved infiltration characteristics. The TSP material layer is then bonded onto a substrate, i.e., a tungsten carbide substrate using an HTHP bonding process where the TSP is infiltrated with an infiltrant such as cobalt from the tungsten carbide substrate. The TSP material layer may be attached to the tungsten carbide substrate using other processes, such as brazing, laser or electron beam welding.

In a further exemplary embodiment, a layer 60 of diamond particles is placed in a refractory metal can 54 over which is placed in another layer 62 of diamond particles mixed with tungsten carbide pellets 52, as for example shown in FIG. 7. The diamond in each of these layers may be the same or may be different, e.g., it may have a different particle size. In one exemplary embodiment, a single layer of diamond is used and tungsten carbide pellets are embedded in only a portion of the layer. The can with diamond particles and tungsten carbide pellets is then HTHP sintered such that the cobalt from the tungsten carbide pellets acts as a catalyst for forming a PCD layer 63 from the diamond particles. The PCD layer 63 has a portion 64 free of tungsten carbide and a portion 66 into which are embedded to the tungsten carbide pellets, as for example shown in FIG. 8. The PCD layer is then leached to form a TSP material layer. Such a TSP material layer may be bonded onto another substrate, as previously discussed using among other things an HTHP bonding process. With this exemplary embodiment, the TSP material layer will have a variable density through its thickness. For example, the portion 66 of the TSP material layer with the embedded tungsten carbide pellets 52 has a lower density than the portion 64 of the layer which does not include the tungsten carbide pellets. In an exemplary embodiment, the TSP material layer is attached to a substrate, such as a tungsten carbide substrate by placing the lower density portion 66 of the TSP material layer adjacent the substrate in a can and subjecting the can with the TSP material layer and substrate to an HTHP bonding process. The lower density TSP material layer portion 66 will facilitate better infiltration by the cobalt from the substrate resulting in an improved bond with the substrate.

In an exemplary embodiment, the ratio of the size of the diamond particles to the size of the tungsten carbide pellets is in a range of 10 microns to 10 to 200 microns or even larger. Other size relationships may be used. In yet a further exemplary embodiment, the particle size of tungsten carbide is in a range of 2 to 4 times the size of the diamond particles. Other tungsten carbide particle sizes may also be used.

Figure 9:
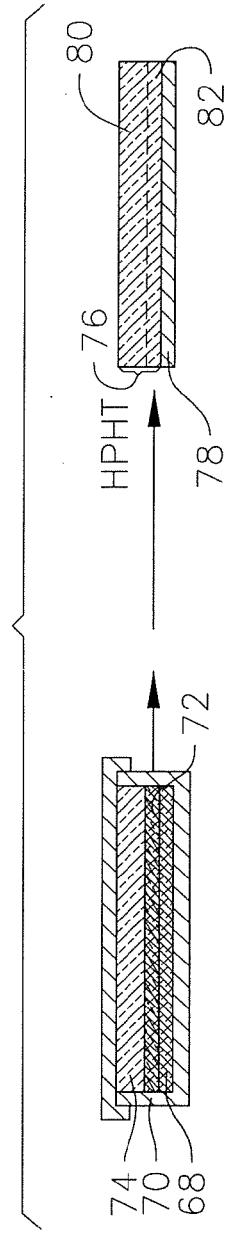
FIG. 9 schematically depicts a method for making another exemplary embodiment TSP material of the present invention.

In yet a further exemplary embodiment, a layer 68 of tungsten carbide pellets is placed in a refractory metal can 70, as shown in FIG. 9. On top of that layer is placed a second layer 72 of diamond particles mixed with tungsten carbide pellets. On top of that layer is placed a third layer 74 of diamond particles. In an exemplary embodiment, the tungsten carbide forming the pellets has a grain size greater than the grain size of the diamond particles. In an exemplary embodiment, the second layer has approximately 80% of diamond particles mixed with 20% of tungsten carbide pellets by volume. In another exemplary embodiment, the second layer has approximately 80% to 95% diamond particles and 5% to 20% tungsten carbide pellets by volume. The can is then HTHP sintered to form PCD layer 76 attached to a tungsten carbide substrate layer 78. More specifically, a PCD layer is formed having a first portion 80, not embedded with the tungsten carbide pellets, with higher density, and a second portion 82, in which are embedded the tungsten carbide pellets, having a lower density. The second portion is attached to the tungsten carbide substrate layer 78, which is formed from the layer 68 tungsten carbide pellets. The PCD is then leached to form TSP material layer having different diamond density through its thickness. The PCD, or the TSP, may be separated from the tungsten carbide substrate and attached to another substrate using known methods such as HTHP bonding. As can be seen, the density of the region of the PCD layer with embedded tungsten carbide pellets is effected by the size of the pellets. Thus, the density of such region may be controlled by controlling the size of the tungsten carbide pellets. More than one size of tungsten carbide pellets may be used in a single PCD layer.

Figure 10:
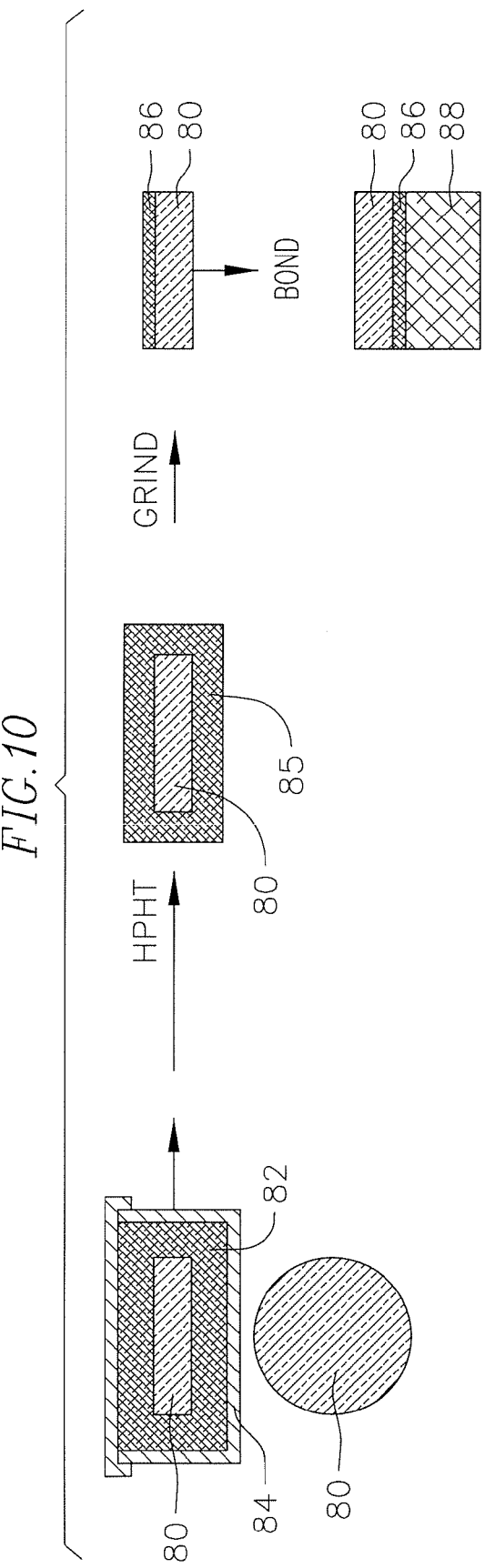

In another exemplary embodiment, a TSP material layer 80 is encapsulated by pre-sintered tungsten carbide powder 82 within a refractory metal can 84, as shown in FIG. 10. The refractory metal can is then exposed to an HTHP bonding process where the TSP material layer bonds to the surrounding tungsten carbide powder forming a TSP material layer encapsulated by a layer 85 of tungsten carbide. In one exemplary embodiment, the volume of tungsten carbide surrounding the TSP material layer is at least equal or greater than the volume of the TSP material layer. The TSP with bonded tungsten carbide layer is then removed from the can and the tungsten carbide layer is removed so as to only leave a tungsten carbide layer 86 bonded to one surface of the TSP material layer 80. The TSP material layer with bonded tungsten carbide layer 86 is then bonded to another substrate 88 using any known method, such as brazing or LS bonding. In another exemplary embodiment, all of the tungsten carbide is removed from the TSP material layer and the TSP material layer 80 is bonded directly onto the new substrate 88 as for example by an HTHP bonding process. The TSP material layer may be re-leached to remove infiltrants, which infiltrated the TSP material layer during the TSP bonding process, from a desired portion of the TSP material layer. By embedding the TSP material layer in the pre-sintered tungsten carbide powder, the cobalt from the tungsten carbide powder is able to infiltrate the TSP material layer from all of the TSP material layer surfaces. In another exemplary embodiment, instead of pre-sintered powder, partially sintered, e.g., non-fully densified tungsten carbide substrates are used to encapsulate the TSP material layer prior in the can 84 prior exposure to the HTHP bonding process.

In yet a further exemplary embodiment, two or more TSP material layers 90 are each embedded in a pre-sintered carbide powder 92 in a refractory metal can 94, as for example shown in FIGS. 11 and 12. The can is sealed and subjected to an HTHP bonding process forming layers 90 of TSP material surrounded by a layer 92 of tungsten carbide. The TSP material layers with bonded tungsten carbide layer are removed from the can and the tungsten carbide layer is removed so as to leave a layer 96 of tungsten carbide and to expose at least a surface of each TSP material layer 90, as for example shown in FIGS. 11 and 12. The layer 96 of tungsten carbide, with bonded TSP material layer, is then bonded onto another substrate 98, as for example shown in FIGS. 11 and 12, using known processes, e.g. brazing and LS bonding.

Figure 13:
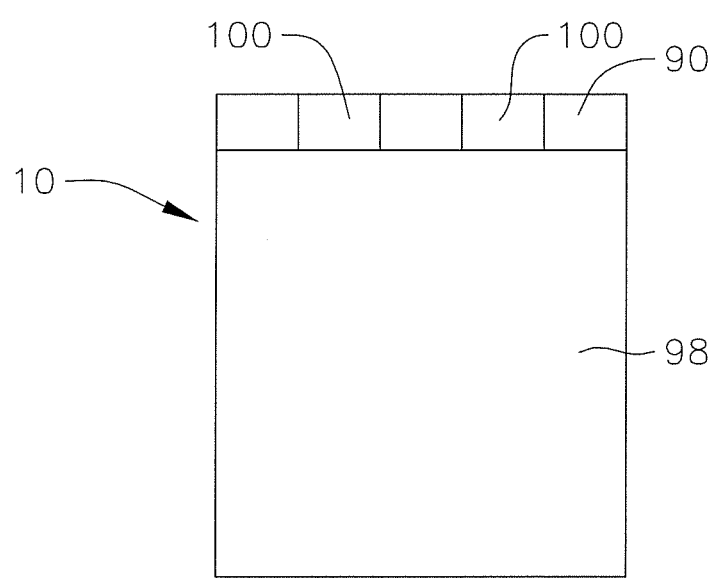
FIG. 13 is a cross-sectional view of another exemplary embodiment cutting element of the present invention.

In another exemplary embodiment, all the tungsten carbide may be removed except the tungsten carbide portion(s) 100 adjoining adjacent TSP material layer 90 and the layer is then bonded onto the new substrate 98, as for example shown in FIG. 13, using, for example, an HTHP bonding process. A portion of at least one of the multiple TSP material layers may be re-leached to remove the infiltrant, e.g. the cobalt that infiltrated the TSP material layer during the HTHP bonding process.

Furthermore, with the aforementioned exemplary embodiments, the amount of tungsten carbide powder that is used when HTHP bonding the TSP onto such powder may be calculated so as to get the proper infiltration of the cobalt from the tungsten carbide powder into the TSP material. Moreover, each of the exemplary embodiment TSP material layers having at least a portion leached of an infiltrant may be re-infiltrated with an oxide, nitride or a ceramic for improving the TSP material toughness and wear resistance.

It should be understood that with all the exemplary embodiments, the can may be vacuumed prior to being exposed to a HTHP sintering for bonding process.

As can be seen with the exemplary embodiment, method of forming TSP material layers, the PCD which is leached to form TSP material may be formed without having to sinter diamond powder onto a cemented tungsten carbide substrate. This simplifies the formation process and reduces the cost of forming the PCD material which is then converted to TSP material.

Although the present invention has been described and illustrated in respect to an exemplary embodiments, it is to be understood that it is not to be so limited, since changes and modifications may be made therein which are within the full intended scope of the this invention. For example, the infiltrants identified herein for infiltrating the TSP material have been identified by way of example. Other infiltrants may also be used to infiltrate the TSP material and include any metals and metal alloys such as Group VIII and Group IB metals and metal alloys. It should be also noted that when a ceramic material or an oxide is used as an infiltrant, such materials cannot be typically leached using a leaching acid. Moreover, it should be understood that the TSP material may be attached to other carbide substrates besides tungsten carbide substrates, such as substrates made of carbides of W, Ti, Mo, Nb, V, Hf, Ta, and Cr. It should be understood that any portion of a TSP material that is infiltrated with a metal or metal alloy infiltrant, e.g., cobalt, may no longer be a TSP material portion as it would include the metal infiltrant, e.g the cobalt. However, for descriptive purposes such portion was referred to herein as a TSP material that has been infiltrated.

What is claimed is:

1. A method of forming TSP compacts comprising:
    placing a plurality of pre-sintered TSP material layers in an enclosure one pre-sintered TSP material layer over another and surrounding each pre-sintered TSP material layer with at least one of a pre-sintered tungsten carbide powder, pre-cemented tungsten carbide powder, tungsten carbide powder including an infiltrant, or partially sintered tungsten carbide substrates;
    exposing said enclosure to a high temperature high pressure sintering process wherein said at least one of a pre-sintered tungsten carbide powder, pre-cemented tungsten carbide powder, tungsten carbide powder, or partially sintered tungsten carbide substrates bonds to said TSP material layers forming a stack of re-processed TSP material layers comprising said re-processed TSP material layers one over the other with tungsten carbide bonded to each of said re-processed TSP material layers and encapsulating each of said re-processed TSP material layers;

removing said stack from said enclosure;

cutting said stack forming a plurality of said re-processed TSP material layers, each of said re-processed TSP material layers having a tungsten carbide material layer formed from said at least one of a pre-sintered tungsten carbide powder, pre-cemented tungsten carbide powder, tungsten carbide powder, or partially sintered tungsten carbide substrates bonded to one surface thereof; and attaching said tungsten carbide layer bonded to one of said plurality of re-processed TSP material layers to a tungsten carbide substrate forming said TSP compact.

2. The method as recited in claim 1 wherein said exposing causes at least a material from at least one of a pre-sintered tungsten carbide powder, pre-cemented tungsten carbide powder, tungsten carbide powder including an infiltrant, or partially sintered tungsten carbide substrates to infiltrate said re-processed TSP material layers, said method further comprising leaching at least a substantial portion of said at least a material from at least a portion of one of said re-processed TSP material layers after said exposing.

3. The method as recited in claim 2 wherein said re-processed TSP material layer is fully infiltrated by said at least a material.

4. The method as recited in claim 1 further comprising:
placing a layer of diamond particles in an enclosure and encapsulating said layer of diamond particles with at least one of a pre-sintered tungsten carbide powder, pre-cemented tungsten carbide powder, tungsten carbide powder including a catalyst, or partially sintered tungsten carbide substrates;

high pressure and high temperature sintering said enclosure to form a layer of polycrystalline diamond surrounded by tungsten carbide, said layer of polycrystalline diamond having a network of interconnected diamond crystals, wherein interstitial spaces are defined between the diamond crystals occupied by at least a catalyst material which infiltrated said diamond particles from said at least one of a pre-sintered tungsten carbide powder, pre-cemented tungsten carbide powder, tungsten carbide powder including a catalyst, or partially sintered tungsten carbide substrates;

removing the tungsten carbide to reveal said layer of polycrystalline diamond; and leaching said layer of polycrystalline diamond to remove at least a substantial portion of said catalyst material from at least a section of said layer of polycrystalline diamond to form at least one of said pre-sintered TSP material layers.

5. The method as recited in claim 1 further comprising:
placing a plurality of layers of diamond particles in an enclosure and encapsulating said layers of diamond particles with at least one of a pre-sintered tungsten carbide powder, pre-cemented tungsten carbide powder, tungsten carbide powder including a catalyst, or partially sintered tungsten carbide substrates;

high pressure and high temperature sintering said enclosure to form a plurality of layers of polycrystalline diamond surrounded by tungsten carbide, said layers of polycrystalline diamond having a network of interconnected diamond crystals, wherein interstitial spaces are defined between the diamond crystals occupied by at least a catalyst material which infiltrated said diamond particles from said at least one of a pre-sintered tungsten carbide powder, pre-cemented tungsten carbide powder, tungsten carbide powder including a catalyst, or partially sintered tungsten carbide substrates;

removing the tungsten carbide to reveal said layers of polycrystalline diamond; and leaching said layers of polycrystalline diamond to remove at least a substantial portion of said catalyst material from at least a section of each of said layers of polycrystalline diamond to form said pre-sintered TSP material layers.

6. The method as recited in claim 5 wherein leaching comprises leaching said layers of polycrystalline diamond to remove at least a substantial portion of said catalyst material from the entire of each of said layers of polycrystalline diamond to form said pre-sintered TSP material layers.

7. A method for forming TSP material comprising:
placing a layer of diamond particles and tungsten carbide pellets in an enclosure, wherein said pellets are mixed in the diamond particles;

high pressure and high temperature sintering said enclosure forming a layer of polycrystalline diamond with tungsten carbide pellets embedded therein, wherein during said sintering process a catalyst from said tungsten carbide pellets infiltrates interstitial spaces defined between said diamond particles; and removing at least a substantial portion of said catalyst from at least a portion of said polycrystalline diamond layer with embedded tungsten carbide pellets forming said TSP material layer.

8. The method as recited in claim 7 wherein said layer of diamond particles and tungsten carbide pellets is a first layer and wherein the method further comprises placing a second layer of tungsten carbide pellets adjacent said first layer in said enclosure, wherein after high pressure and high temperature sintering said layers of tungsten carbide pellets form a layer of tungsten carbide.

9. The method as recited in claim 8 further comprising placing a third layer of diamond particles adjacent the first layer in said enclosure, wherein the first layer is sandwiched between the second and third layers in said enclosure, wherein after high temperature and high pressure sintering a compact is formed comprising the tungsten carbide layer attached to polycrystalline diamond layer having a first portion without tungsten carbide pellets and a second portion with embedded tungsten carbide pellets.

10. The method as recited in claim 9 wherein the tungsten carbide forming said pellets has a grain size which is greater than a maximum grain size of said diamond particles.

11. The method as recited in claim 9 wherein said first layer comprises 80% by volume diamond particles and 20% by volume tungsten carbide pellets.

12. The method as recited in claim 9 wherein said first layer comprises 80% to 95% by volume diamond particles and 5% to 20% by volume tungsten carbide pellets.

13. The method as recited in claim 7 wherein said first layer comprises 80% by volume diamond particles and 20% by volume tungsten carbide pellets.

14. The method as recited in claim 7 wherein said first layer comprises 80% to 95% by volume diamond particles and 5% to 20% by volume tungsten carbide pellets.

15. The method as recited in claim 7 wherein said layer of diamond particles and tungsten carbide pellets is a first layer and wherein the method further comprises placing a second layer of diamond particles adjacent said first layer in said enclosure, wherein after high temperature and high pressure sintering a polycrystalline diamond layer is formed having a first portion without tungsten carbide pellets and a second portion with embedded tungsten carbide pellets.

16. A method of forming a TSP material compact comprising;
   placing at least one of a pre-sintered tungsten carbide powder, pre-cemented tungsten carbide powder, tungsten carbide powder including an infiltrant, or partially sintered tungsten carbide and at least a pre-sintered TSP material layer in an enclosure, wherein the at least one of a pre-sintered tungsten carbide powder, pre-cemented tungsten carbide powder, tungsten carbide powder including an infiltrant, or partially sintered tungsten carbide substrates encapsulates the at least a TSP material layer;
   exposing the enclosure to a high temperature high pressure process forming at least a layer of re-processed TSP material bonded to a layer of tungsten carbide; and
   attaching said layer of tungsten carbide to a substrate forming said TSP material compact.

17. The method as recited in claim 16 wherein the tungsten carbide layer encapsulates the at least a re-processed TSP material layer.

18. The method as recited in claim 17 wherein the at least a pre-sintered TSP material layer is a single pre-sintered TSP material layer, the method further comprising removing a portion of said tungsten carbide layer exposing a surface of the re-processed TSP material layer and a periphery of the re-processed TSP material layer, wherein attaching comprises attaching a remaining portion of said tungsten carbide layer to said substrate, and wherein said remaining portion is sandwiched between the substrate and the re-processed TSP material layer.

19. The method as recited in claim 18 wherein an infiltrant infiltrates said re-processed TSP material layer during said exposing the enclosure to a high temperature high pressure process, the method further comprising removing at least a substantial portion of said infiltrant from at least a portion of said re-processed TSP material layer.

20. The method as recited in claim 16 wherein the at least a pre-sintered TSP material layer comprises a plurality of spaced apart TSP material layers, wherein after exposing said tungsten carbide layer fully encapsulates each of said plurality of re-processed TSP material layers.

21. The method as recited in claim 20 further comprising removing a portion of said tungsten carbide layer exposing at least surface of each re-processed TSP material layer of said plurality of re-processed TSP material layers, and wherein attaching comprises attaching a remaining portion of said tungsten carbide layer to said substrate.

22. The method as recited in claim 21 wherein an infiltrant infiltrates said re-processed TSP material layers during said exposing the enclosure to a high temperature high pressure process, the method further comprising removing at least a substantial portion of said infiltrant from at least a portion of each of said plurality of re-processed TSP material layers.

23. A method of forming TSP compacts comprising:
   placing a plurality of sintered TSP material layers in an enclosure one sintered TSP material layer over another and surrounding each sintered TSP material layer with at least one of a pre-sintered tungsten carbide powder, pre-cemented tungsten carbide powder, tungsten carbide powder including an infiltrant, or partially sintered tungsten carbide substrates;
   exposing said enclosure to a high temperature high pressure sintering process wherein said at least one of a pre-sintered tungsten carbide powder, pre-cemented tungsten carbide powder, tungsten carbide powder, or partially sintered tungsten carbide substrates bonds to said TSP material layers forming a stack of re-processed TSP material layers comprising said re-processed TSP material layers one over the other with tungsten carbide bonded to each of said re-processed TSP material layers and surrounding each of said re-processed TSP material layers;
   removing said stack from said enclosure;
   cutting said stack forming a plurality of said re-processed TSP material layers, each of said plurality of re-processed TSP material layers having a tungsten carbide material layer formed from said at least one of a pre-sintered tungsten carbide powder, pre-cemented tungsten carbide powder, tungsten carbide powder, or partially sintered tungsten carbide substrates bonded to one surface thereof; and
   attaching said tungsten carbide layer bonded to one of said plurality of re-processed TSP material layers to a tungsten carbide substrate forming said TSP compact.

24. The method as recited in claim 7 further comprising attaching said TSP material layer to a substrate using a high temperature high pressure sintering process.

* * * * *